Oct. 14, 1969 SADAYOSHI YOSHIKAWA 3,473,081

HIGH VOLTAGE STABILIZING CIRCUITS

Filed Nov. 4, 1966 4 Sheets-Sheet 1

INVENTOR.
SADAYOSHI YOSHIKAWA
BY
Roberts & Cohen
ATTORNEYS

Oct. 14, 1969 SADAYOSHI YOSHIKAWA 3,473,081

HIGH VOLTAGE STABILIZING CIRCUITS

Filed Nov. 4, 1966 4 Sheets-Sheet 2

INVENTOR.
SADAYOSHI YOSHIKAWA
BY
Roberts & Cohen
ATTORNEYS

Oct. 14, 1969 SADAYOSHI YOSHIKAWA 3,473,081

HIGH VOLTAGE STABILIZING CIRCUITS

Filed Nov. 4, 1966 4 Sheets-Sheet 3

INVENTOR.
SADAYOSHI YOSHIKAWA

BY

Roberts & Cohen

ATTORNEYS

Oct. 14, 1969 SADAYOSHI YOSHIKAWA 3,473,081

HIGH VOLTAGE STABILIZING CIRCUITS

Filed Nov. 4, 1966 4 Sheets-Sheet 4

INVENTOR.
SADAYOSHI YOSHIKAWA
BY
Roberts & Cohen
ATTORNEYS

United States Patent Office 3,473,081

Patented Oct. 14, 1969

3,473,081

HIGH VOLTAGE STABILIZING CIRCUITS

Sadayoshi Yoshikawa, Osaka, Japan, assignor to New Nippon Electric Company, Ltd., Osaka, Japan Filed Nov. 4, 1966, Ser. No. 592,024
Int. Cl. H01j 29/46, 29/56
U.S. Cl. 315—30 9 Claims

ABSTRACT OF THE DISCLOSURE

To regulate the anode voltage applied to a cathode ray tube, a transistor circuit is connected between a high voltage generator coupled to the anode and its power supply. The transistor circuit is connected to the cathode of the cathode ray tube and is controlled by the voltage at the cathode to control, in turn, the high voltage generator.

This invention relates to high-voltage and amplitude stabilizing circuits and more particularly to circuits for use with cathode ray tubes and the like.

In some known circuits of the above type used with picture tubes, an attempt is made to maintain picture size constant despite variations in beam current, by means of adjusting the grid bias or plate voltages in the associated horizontal and vertical deflection circuits. It is not found possible, however, to maintain picture size precisely constant for reasons which will hereafter be indicated.

In accordance with the invention, the object is achieved of maintaining picture size constant despite variations of beam current due, for example, to brightness control. Moreover, this result is achieved advantageously without the need for controlling horizontal or vertical deflection circuits in contrast to the prior art.

In various known circuits of the aforesaid type, electron tubes are employed for high-voltage stabilization due to their high dielectric strength and for reasons of cost. Nevertheless, for reasons of miniaturization and heat dissipation, it would be desirable to employ transistors. In this respect, it is another object of the invention to provide a transistorized high-voltage stabilizing circuit.

In achieving the above and other of its objects, the invention includes within its scope the provision of means sensitive to changes in beam or cathode current in a cathode ray tube or the like to regulate associated picture size, high-voltage or other such parameters. Preferably this is achieved by means of transistors and preferably by means which are independent of horizontal and/or vertical deflection circuits associated with the cathode ray tube.

More precise details of how the aforesaid objects of the invention are achieved appear along with further elucidation of how the invention distinguishes from the prior art, in the following discussion of two embodiments as illustrated in the accompanying drawings, in which.

Conventional automatic high-voltage stabilizing circuits used in television receivers are so constructed that the horizontal deflection circuit functions as the high-voltage generating circuit. Moreover, such stabilizing circuits employ electron tubes to achieve their purposes. A typical example of such circuitry is shown in FIG. 1.

Figure 1:
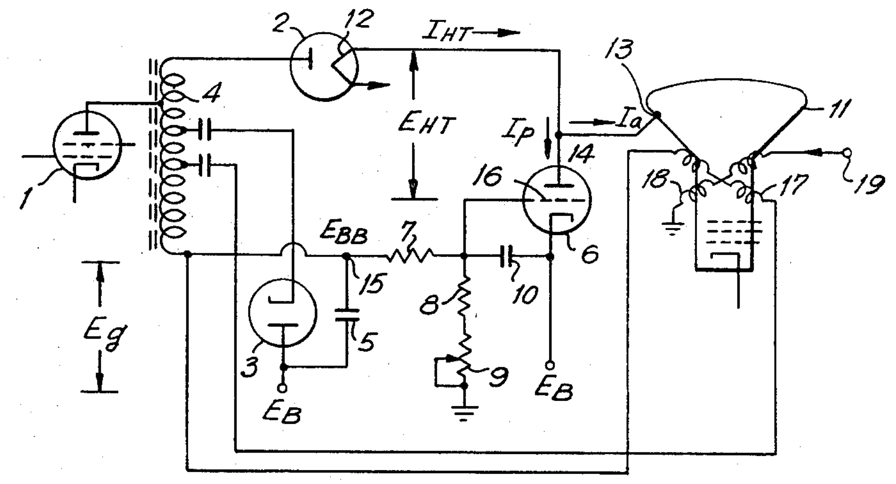
FIG. 1 PRIOR ART
FIGURE 1 is a schematic diagram of a prior art high-voltage stabilizing circuit employed with a cathode ray tube.

In FIG. 1, a circuit is illustrated which comprises a horizontal output tube 1, a high-voltage rectifier 2, a damper tube 3, a flyback transformer 4, a booster condenser 5, a high-voltage stabilizing tube 6, and bias resistors 7 and 8 for the high-voltage stabilizing tube 6. The circuit also includes a bias adjusting resistor 9, a bypass condenser 10 for the high-voltage stabilizing tube 6, a cathode ray tube 11, a horizontal deflection coil 17, a vertical deflection coil 18 and a terminal 19 from a conventional deflection circuit.

In the above high-voltage generating circuit, the anode current $I_a$ of the cathode ray tube 11 which flows through the anode terminal 13 varies according to adjustment of the brightness level. The high output voltage $E_{HT}$ of the high-voltage rectifier 2 increases as the anode current $I_a$ decreases. At the same time, the booster voltage $E_{BB}$ appearing at the junction 15 of flyback transformer 4, booster condenser 5 and bias resistor 7, positively increases, consequently increasing the anode current $I_p$ through high-voltage stabilizing tube 6 to compensate for the decrease of $I_a$ in the cathode ray tube 11. On the other hand, as the anode current $I_a$ of the cathode ray tube 11 increases, the high output voltage $E_{HT}$ and the booster voltage $E_{BB}$ decrease. The plate current $I_p$ of the high-voltage stabilizing tube 6 decreases and functions to cancel the increment of the anode current $I_a$ of the cathode ray tube 11. Thus, it is seen that this high-voltage stabilizing circuit employs a DC feed-back circuit.

The sum current $I_{HT}$ of the anode current $I_a$ of the cathode ray tube 11 and the anode current $I_p$ of the high-voltage stabilizing tube 6 is equal to the current that flows through the cathode 12 of the high-voltage rectifier tube 2. The high-voltage output current $I_{HT}$ is maintained constant as described above and the high-voltage output $E_{HT}$ is also thus maintained constant.

The voltage across the grid 16 of the high-voltage stabilizing tube 6 is adjusted by the bias controlling variable resistor 9 to make the anode current $I_p$ of the high-voltage stabilizing tube 6 zero when then anode current $I_a$ of the cathode ray tube 11 reaches its desired maximum value. Under these conditions, in case the anode current $I_a$ of the cathode ray tube 11 becomes zero, the anode current $I_p$ of the high- voltage stabilizing tube 6 increases so as to become equal to the desired maximum anode current of the cathode ray tube 11. Assuming the desired maximum anode voltage of the cathode ray tube 11 is 20 kv. and its desired maximum anode current is 1 ma., if the anode current of the cathode ray tube 11 is made equal to zero, then the anode current of the $I_p$ of the high-voltage stabilizing tube 6 becomes 1 ma. The power consumption of the stabilizer tube 6 then becomes as much as 20 w. since the desired maximum anode voltage of the cathode ray tube 11 is 20 kv.

The electron tube has been widely used for the above operation, because it has large dielectric strength and is economical. However, it is desirable to be able to use a semi-conductor element to obtain the above functions especially where the miniaturization of the unit as a whole is important. A transistor of special type having available a large output power would be required in such a high-voltage circuit as above. However, it has not yet been possible to manufacture high-voltage transistors equivalent to high-voltage stabilizing tubes.

This invention is proposed partly in respect of the above drawback and provides the means by which a stabilized high-voltage output is rendered available with transistors of small power consumption and with a low-power supply voltage.

Figure 2:
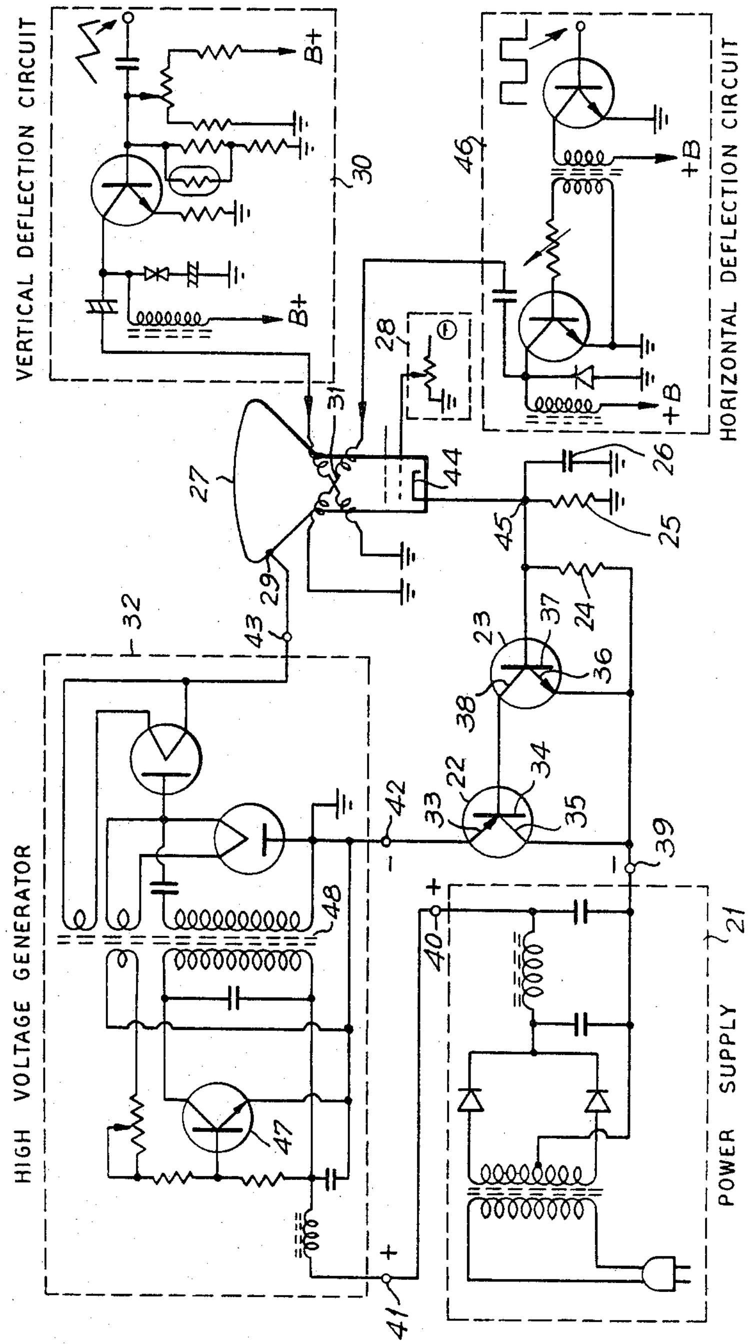
FIGURE 2 is a schematic diagram of a first embodiment of the invention which is an improvement over the circuit of FIG. 1.

One of the embodiments of this invention is shown in FIG. 2 in which is illustrated a circuit comprising a power supply 21, a P-N-P type transistor 22, an N-P-N transistor 23, and bias resistors 24 and 25 for the transistor 23. Also included are a bypass condenser 26, a cathode ray tube 27, a brightness adjustment circuit 28, a conventional horizontal deflection circuit 46, a conventional vertical deflection circuit 30, deflection coils 31, and a high-voltage generator 32.

The negative terminal 39 of the power supply 21 is connected to the emitter 36 of the transistor 23 and to the collector 35 of the transistor 22. The positive terminal 40 is connected to the terminal 41 of the high-voltage generator 32. The terminal 42 of the high-voltage generator 32 is connected to the emitter 33 of the transistor 22, and the output terminal 43 is connected to the anode terminal 29 of the cathode ray tube 27. The base 34 of the transistor 22 is directly connected to the collector 38 of the transistor 23, and the bias resistor 24 is connected between the base 37 of the transistor 23 and its emitter 36. Further, the base 37 of the transistor 23 is directly connected to the cathode 44 of the cathode ray tube 27. The bias resistor 25 and the condenser 26 are connected in parallel between ground and the junction 45 of the base 37 and the cathode 44. In connection with the deflection coils, one coil is connected to the vertical deflection circuit 30 and the other is connected to the horizontal deflection circuit 46. Thus, these conventional deflection circuits 30 and 46 don't use the high-voltage generator 32. As for the high-voltage generator 32, it is a blocking oscillator type. Therefore large flyback pulses arise on the collector of the transistor 47. These pulses are stepped up by the step-up transformer 48 by about 50 to 100 times. These high-voltage flyback pulses are rectified by the voltage doubler circuit to be supplied to the anode 29 of the cathode ray tube 27. The rest of the circuit is as in the conventional circuit, but in accordance with this invention a predetermined amount of bias is appled to transistor 23 by means of the resistors 24 and 25 so as to give a predetermined voltage difference between the collector 35 and the emitter 33 of the transistor 22.

In the above circuit, when the cathode current of the cathode ray tube 27 is zero, the potential of the junction 45 is low and the collector current of the transistor 23 decreases while the potential of the collector 38 increases. The potential of the base 34 of the transistor 22 is thus increased and the voltage difference between the emitter 33 and the collector 35 of the transistor 22 also increases.

This operation, in other words, is as follows: When the cathode current of the cathode ray tube 27 is reduced to zero, the current flowing from the terminal 43 of the high-voltage generator to the anode 29 of the cathode ray tube also decreases. Thus, the high-voltage at anode 29 is increased. This also increases the voltage drop between the emitter and the collector of the transistor 22 as previously described, lowering the power supply voltage supplied to the high-voltage generator 32 so that the high-voltage output is lowered to the desired level.

On the other hand, in case the cathode current of the cathode ray tube 27 increases, the potential of the junction 45 increases in a positive sense. The collector current of the transistor 23 thus increases, lowering the potential of the collector 38 and decreasing the bias of the base 34 of the transistor 22. This also decreases the voltage drop between the emitter and the collector of the transistor 22 and increases the power supply voltage supplied to the high-voltage generator 32. Thus, the high-voltage output is increased to the desired level.

That is, the voltage control of the supply voltage across the terminals 41 and 42 is performed by such a way that the current variation of the cathode 44 is amplified by the transistor 23, of which the output controls the base current of the transistor 22, and thus the voltage drop between collector 35 and emitter 33 of the transistor 22 controls the supply voltage in the high-voltage generator. As a result of the above described operation, the high-voltage supply for the anode 29 is always kept constant and independent of the cathode current of the cathode ray tube 27. Therefore the terminal 43 is the high-voltage output one.

Figure 3:
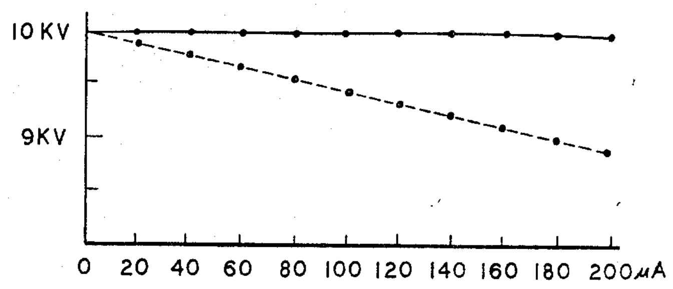
FIGURE 3 is a chart which shows the voltage regulation characteristics of the aforesaid circuits.

In the chart of FIG. 3, the vertical axis is the high-voltage output and the horizontal axis is the cathode current of the cathode ray tube. The solid line represents the regulation characteristic when this invention is applied and the dotted line represents the characteristic when the invention is not applied (e.g., when the terminals 39 and 42 are connected directly and the transistors 22 and 23, and the resistor 24 are eliminated). It is seen from this graph that the high-voltage output can be maintained approximately constant when this invention is applied.

This invention makes it easy to maintain the high-voltage to be applied to the anode of a cathode ray tube constant automatically regardless of the value of cathode current of the cathode ray tube by controlling with a transistor circuit, the power supply voltage supplied to the high-voltage generating part. This invention therefore provides the effective picture control using transistors for producing miniaturized television receivers.

In the above embodiment, the transistor circuitry is connected to the negative terminal of the power supply. It is apparent, however, that the same result is obtained by connecting the transistor circuit to the positive terminal of the power supply with a different combination of transistor connections.

This invention also relates to automatic amplitude stabilizing devices to be applied to high-voltage developing circuits to obtain predetermined and constant picture amplitudes in devices which employ cathode ray tubes and of the type having a horizontal sweep circuit which does not simultaneously function as the high-voltage generating circuit.

Figure 4:
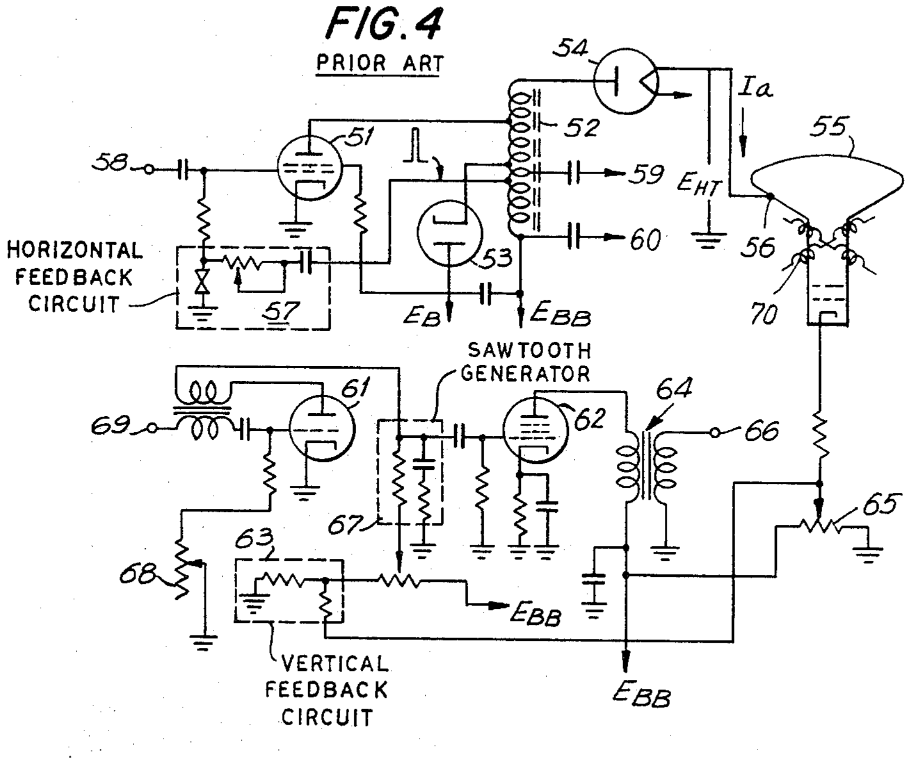
FIG. 4 PRIOR ART
FIGURE 4 is a schematic diagram of another prior art raster amplitude or picture size stabilizing circuit.

A conventional circuit of this type is shown in FIG. 4 which illustrates a circuit comprising a horizontal output tube 51, a horizontal output transformer 52, a damper tube 53, a high-voltage rectifier 54, a cathode ray tube 55, and an anode terminal 56 for cathode ray tube 55. Also included is a horizontal feedback circuit 57, an input terminal 58 from the horizontal oscillator circuit (not shown), output terminals 59 and 60 which feed the horizontal deflection coil 70, a vertical oscillator tube 61, a vertical output tube 62, a a vertical feedback circuit 63, a vertical output transformer 64, a potentiometer 65 to adjust brightness level, an output terminal 66 feeding the vertical section of deflection coil 70, a sawtooth-wave voltage generating circuit 67, a potentiometer 68 to adjust vertical synchronization, and an input terminal 69 from the vertical synchronizing circuit (not shown).

In this circuit, the raster amplitude tends to increase when the beam current I*a* of the cathode ray tube is increased by adjustment of the brightness adjusting potentiometer 65. At the same time, the high-voltage output $E_{HT}$ is decreased and sweep efficiency is increased. Also, the pulse voltage of the horizontal output transformer 52 then decreases and the negative control grid bias of the horizontal output tube 51 increases in magnitude due to the feedback circuit 57 so that the horizontal sweep output across the output terminals 59 and 60 decreases. The circuit consequently operates to maintain the picture amplitude constant.

On the other hand, in the vertical sweep circuit, when the high-voltage output decreases, the deflecting efficiency increases, consequently the vertical amplitude of the picture tends to increase. The plate voltage of the vertical oscillator 61 decreases in this case due to the feedback circuit 63, and the circuit then operates to decrease the picture amplitude because the oscillator output is decreased so that the vertical amplitude is maintained constant.

The deflection efficiency tends to decrease in case the beam current of the cathode ray tube decreases and the high-voltage output $E_{HT}$ to be applied to the anode of the cathode ray tube increases. The control grid bias voltage of the horizontal output tube 51 then decreases in magnitude due to the feedback circuit 57 to increase the horizontal deflection output which appears between terminals 59 and 60 connected to the horizontal deflection coil 70. This increment in the horizontal deflection output acts to restore the picture amplitude and maintains the horizontal amplitude of the picture constant. Also, the decrease of the deflecting efficiency in the vertical deflection circuit increases the plate voltage of the vertical oscillator 61 due to the feedback circuit 63 so that the vertical output is increased. This increment in the vertical deflection output restores the vertical amplitude of the picture and maintains it constant.

The conventional automatic amplitude stabilizing method described above has inherent disadvantages such as, for example, the need of adjusting the grid bias or the plate voltage of the horizontal and vertical deflection circuits to maintain picture amplitude constant whenever there is a variation of the high anode voltage of the cathode ray tube. Another disadvantage is that picture amplitude cannot be maintained perfectly constant against changes of beam current of the cathode ray tube.

This invention is proposed with respect to these defects of conventional automatic amplitude stabilizing devices, and makes it possible, by the use of semi-conductor elements, to obtain constant amplitude without changing the operating conditions of the horizontal and vertical output tubes.

Figure 5:
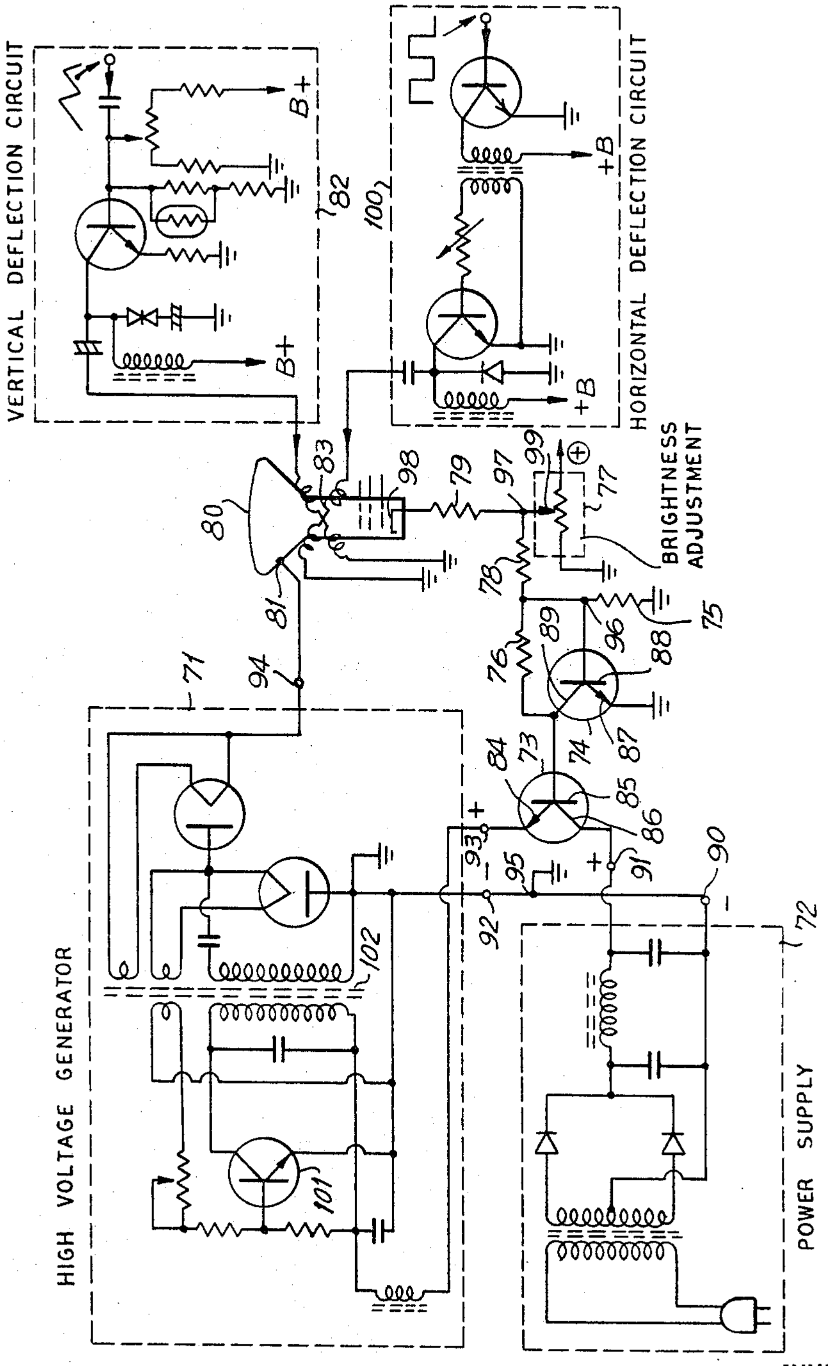
FIGURE 5 is a schematic diagram of a circuit in accordance with a second embodiment of the invention which is an improvement over the circuit of FIG. 4.

One of the embodiments of this invention to accomplish the above is shown in FIG. 5, in which is shown a circuit which comprises a high-voltage generator 71, a power supply 72, N-P-N transistors 73 and 74, and bias resistors 75 and 76 for the transistor 74. Further included are a variable resistor 77 for brightness adjustment, a coupling resistor 78, and a cathode load resistor 79 for a cathode ray tube 80. Element 81 is an anode terminal for the cathode ray tube 80. Circuit 82 is a conventional deflection circuit which feeds one of deflection coils 83 as shown in the drawing, and also circuit 100 is a conventional deflection circuit which is connected to another of the deflection coils 83. The terminal 92 of the high-voltage generator 71 and the negative terminal 90 of the power supply 72 are grounded via junction 95. The collector 86 of the transistor 73 is connected to the positive terminal 91 of the power supply 72, while the emitter 84 is connected to the terminal 93 of the high-voltage generator part 71. The circuits 71 and 72 which are used hereon are both conventional ones as used in FIG. 2. Therefore, in the high-voltage generator, large flyback pulses arise on the collector of the transistor 101 at the cut-off period. These pulses are stepped up by the step-up transformer 102 by about 50 to 100 times. These high-voltage flyback pulses are rectified by the voltage doubler circuit, and are supplied to the anode 81 of the cathode ray tube 80. The base 85 of the transistor 73 is directly coupled to collector 89 of the transistor 74. Transistor 74 is used for detecting and amplifying the cathode bias of the cathode ray tube 80 and the emitter 87 is grounded. The bias resistor 76 is connected between the base 88 and the collector 89. Further, the base 88 is grounded via junction 96 through the bias resistor 75.

It is possible to obtain a constant voltage difference between the collector and emitter of the transistor 73 by connecting the bias resistors 75 and 76 as described above. The base 88 of the transistor 74 is connected through the coupling resistor 78 to one end of the load-resistor 79 which, at the other end, is connected to the cathode 98 of the cathode ray tube 80. The junction on 97 of the resistors 78 and 79 is connected to the slider 99 of the brightness-control variable resistor 77. The deflection coil 83 is connected to the separately provided deflection circuit 82, and the anode terminal 81 of the cathode ray tube 80 is connected to the output terminal 94 of the high-voltage generator 71.

In the above circuit, when the bias of the cathode 98 of the cathode ray tube 80 is made smaller by moving the slider 99 of the brightness-control variable resistor 77 toward the ground side, the beam current of the cathode ray tube 80 increases thereby lowering the high-voltage at the anode 81. The deflecting efficiency consequently increases so that the picture amplitude tends to increase. The base bias of the transistor 74 is then made greater due to the transistor 74 is decreased thereby increasing the potential of the collector 89. The base potential of the transistor 73 is therefore increased making the biasing smaller and decreasing the voltage drop between the collector and emitter of the transistor 73. This in effect increases the power supply voltage and restores the high-voltage output which tends to decrease preventing an increase of picture amplitude.

In case the beam current of the cathode ray tube 80 is decreased by moving the slider 99 of the brightness-control variable resistor 77 in the opposite direction with respect to the ground side, the high-voltage at the anode of the cathode ray tube 80 increases. The deflection efficiency is accordingly lowered and the picture amplitude tends to decrease. At this time, the base biasing of the transistor 74 is decreased due to the coupling resistor 78, and the potential at the junction 96 increases thereby increasing the collector current of the transistor 74 and lowering the potential of the collector 89. The base biasing of the transistor 73 is then increased and the voltage drop between the emitter and the collector of the transistor 73 increases. This in effect lowers the power supply voltage. Consequently, the high-voltage output, which tends to increase, is lowered, and restores the original condition and maintains the constant amplitude by preventing a decrease of amplitude.

That is, the voltage control of the supply voltage across the terminals 93 and 92 is performed by such a way that the voltage variation of the junction 97 is amplified by the transistor 74, of which the output controls the base current of the transistor 73, and thus voltage drop between the collector 86 and the emitter 84 of the transistor 73 controls the supply voltage to the high-voltage generator.

This invention has the result of maintaining the picture amplitude constant by regulating the high-voltage output to a constant value at all times by controlling the base biasing of the transistor inserted between the power supply and the high-voltage generator. The base biasing of the transistor is controlled in conjunction with the brightness control of the cathode ray tube so that the voltage difference between the collector and the emitter, or the power supply voltage, is regulated.

In the latter embodiment, the transistor circuit is connected to the negative terminal of the power supply, but it is apparent that the same result is obtained by connecting the circuit to the positive terminal of the power supply with a different combination of transistor connections. As a result of the above described operation, the high-voltage supply for the anode of the cathode ray tube is always kept constant and independent of the brightness control of the cathode ray tube. Therefore the picture amplitude value is always kept constant.

There will now be obvious to those skilled in the art many modifications of the circuits described above. These modifications will not, however, depart from the scope of the invention if defined by the following claims or equivalent thereto.

What is claimed is:

1. A circuit comprising a cathode ray tube including a cathode and a high-voltage anode terminal, a high-voltage generator means coupled to said anode terminal, a power supply coupled to said generator means, brightness control means coupled to said cathode ray tube and influencing the amount of current flowing through said cathode, transistor means coupled to said cathode, said transistor means being coupled between said power supply and high-voltage generator and controlling the latter in accordance with current flow through the cathode, and a horizontal deflection circuit coupled to said tube separately of said generator means, said transistor means including first and second transistors coupled to each other and being further respectively coupled to said cathode and between said generator and power supply to control the supply of power from the power supply to the generator.

2. A circuit as claimed in claim 1 wherein said first transistor is coupled directly to said cathode.

3. A circuit as claimed in claim 1 comprising a bias resistor coupled to said cathode and wherein said first transistor is coupled to said cathode via said resistor.

4. A circuit as claimed in claim 2, wherein said first and second transistors each including base, emitter and collector, said circuit further comprising a first resistor coupled between said cathode and ground, the base of said first transistor being coupled to said cathode, and a second resistor coupled between said cathode and the emitter of said first transistor, the emitter of the first transistor and collector of the second transistor being coupled to said power supply, the collector of the first transistor being coupled to the base of said second transistor and the emitter of the second transistor being coupled to said high-voltage generator.

5. A circuit as claimed in claim 4 wherein said tube includes a grid and the brightness control includes a potentiometer coupled to said grid.

6. A circuit as claimed in claim 5 wherein said first transistor is of the N-P-N type and the second transistor is of the P-N-P type.

7. A circuit as claimed in claim 3 wherein said brightness control includes a potentiometer coupled to said bias resistor, comprising first and second transistors each including a base, emitter and collector, second, third and fourth resistors, the second and third resisotrs being connected at a junction and being respectively coupled to said fourth resistors, the second and third resistors being coupled between the base and collector of the first transistor, the base, emitter and collector of the first transistor being respectively coupled to said junction, ground and base of the second transistor, the collector and emitter of the second transistor being respectively coupled to said power supply and generator.

8. A circuit as claimed in claim 7 wherein the first and second transistors are both of the N-P-N type.

9. A circuit as claimed in claim 8 wherein the power supply includes negative and positive terminals respectively coupled to said generator and the collector of the second transistor.

References Cited

UNITED STATES PATENTS

| | | | |
|---|---|---|---|
| 2,371,897 | 3/1945 | Knick | 315—30 |
| 2,577,112 | 12/1951 | Duke | 315—30 X |
| 2,621,305 | 12/1952 | Little et al. | |

RODNEY D. BENNETT, Jr., Primary Examiner

MALCOLM F. HUBLER, Assistant Examiner

U.S. Cl. X.R.

315—31; 328—267